(12) United States Patent
Tomic et al.

(10) Patent No.: US 8,019,727 B2
(45) Date of Patent: Sep. 13, 2011

(54) PULL MODEL FOR FILE REPLICATION AT MULTIPLE DATA CENTERS

(75) Inventors: George Tomic, Calgary (CA); Arthur Wong, Atherton, CA (US)

(73) Assignee: Symantec Corporation, Mountain View, CA (US)

( * ) Notice: Subject to any disclaimer, the term of this patent is extended or adjusted under 35 U.S.C. 154(b) by 955 days.

(21) Appl. No.: 11/861,899

(22) Filed: Sep. 26, 2007

(65) Prior Publication Data

US 2009/0083342 A1   Mar. 26, 2009

(51) Int. Cl.
*G06F 7/00* (2006.01)
*G06F 17/00* (2006.01)
*G06F 15/16* (2006.01)

(52) U.S. Cl. .................. 707/652; 707/614; 709/217

(58) Field of Classification Search .............. 707/1, 104, 707/652, 614
See application file for complete search history.

(56) References Cited

U.S. PATENT DOCUMENTS

| | | | |
|---|---|---|---|
| 5,926,819 A * | 7/1999 | Doo et al. ............. | 707/104 |
| 6,049,809 A * | 4/2000 | Raman et al. ............. | 707/203 |
| 6,301,589 B1 * | 10/2001 | Hirashima et al. ............. | 707/204 |
| 6,820,098 B1 | 11/2004 | Ganesh | |
| 7,240,060 B2 | 7/2007 | Adya | |
| 7,296,237 B2 | 11/2007 | Crocker | |
| 7,320,088 B1 | 1/2008 | Gawali | |
| 7,389,309 B2 | 6/2008 | Edelstein | |
| 7,454,424 B2 * | 11/2008 | Cherkasova ............. | 707/10 |
| 2005/0216428 A1 * | 9/2005 | Yagawa ............. | 707/1 |
| 2007/0043726 A1 | 2/2007 | Chan | |
| 2007/0185973 A1 * | 8/2007 | Wayda et al. ............. | 709/217 |

* cited by examiner

*Primary Examiner* — Apu Mofiz
*Assistant Examiner* — Chelcie Daye
(74) *Attorney, Agent, or Firm* — Meyertons, Hood, Kivlin, Kowert & Goetzel, P.C.

(57) ABSTRACT

Various embodiments of a system and method for replicating a file over multiple data centers are described. The method may comprise creating a plurality of file records in a database at a data center that initially receives the file. Each record may correspond to a destination data center at which the file should be stored. The file records may be replicated to respective databases at each of the destination data centers, and each respective destination data center may pull a copy of the file to the respective destination data center. When a file is pulled to a given destination data center, the file record corresponding to the copy of the file at the given destination data center may be updated, and the updated file record may be communicated to the other destination data centers.

18 Claims, 8 Drawing Sheets

| File ID | Dest. Site ID | Current Site ID | File Location |
|---------|---------------|-----------------|---------------|
| 1000 | 1 | 1 | \\192.168.1.100\Uploaded\Test.doc |
| 1000 | 2 | 1 | \\192.168.1.100\Uploaded\Test.doc |

FIG. 4

| File ID | Dest. Site ID | Current Site ID | File Location |
|---|---|---|---|
| 1000 | 1 | 1 | \\192.168.1.126\Docs\Test.doc |
| 1000 | 2 | 1 | \\192.168.1.100\Uploaded\Test.doc |

FIG. 5

| File ID | Dest. Site ID | Current Site ID | File Location |
|---|---|---|---|
| 1000 | 1 | 1 | \\192.168.1.126\Docs\Test.doc |
| 1000 | 2 | 2 | \\172.16.100.22\Vol1\Dir1\Test.doc |

FIG. 6

Request Queue 400

| File ID = 1065 | File ID = 1215 | File ID = 968 | File ID = 1104 | File ID = 1017 |
| Priority = Normal | Priority = Normal | Priority = Normal | Priority = Normal | Priority = Normal |

FIG. 7

| File ID = 1104 | File ID = 1215 | File ID = 968 | File ID = 1065 | File ID = 1017 |
| Priority = High | Priority = Normal | Priority = Normal | Priority = Normal | Priority = Normal |

FIG. 8

PULL MODEL FOR FILE REPLICATION AT MULTIPLE DATA CENTERS

BACKGROUND OF THE INVENTION

1. Field of the Invention

This invention relates generally to the field of distributed software applications. More particularly, the invention relates to a system and method for replicating files at multiple data centers using a pull model of file replication.

2. Description of the Related Art

The data that is accessed by a software application is generally organized into files managed by a computer system. If the computer system or the storage device on which the files are stored fails or becomes inaccessible, the software may not be able to access data that it needs. To protect against such a scenario, files may be replicated across multiple computer systems. For example, if the file is stored on one computer system that temporarily becomes unavailable then the application can still access another copy of the file if the file was previously replicated to another computer system.

Many businesses and other organizations rely upon software applications that access large amounts of data for mission-critical applications. Many of these applications require near-continuous access to data. For example, applications such as retail processing applications, airline reservation applications, and financial service applications must be available to perform transaction processing 24 hours a day. Systems that require data to be constantly available may use file replication techniques to replicate files across multiple computer systems.

SUMMARY

Various embodiments of a system and method for replicating a file at a plurality of data centers are described herein. According to one embodiment of the method, a first data center may receive a file and store a first copy of the file. The first data center may determine that a second copy of the file should be stored at a second data center and may send information regarding the file to the second data center.

In response to receiving the information regarding the file, the second data center may write information into a database at the second data center, where the information written to the database indicates that the file needs to be transmitted to the second data center to create the second copy of the file. The second data center may initiate a transfer operation to transmit the file to the second data center to create the second copy of the file.

According to a further embodiment of the method, after writing the information into the database at the second data center, the second data center may query the database to determine one or more files that need to be transmitted to the second data center. The second data center may initiate the transfer operation to transmit the file to the second data center in response to the database query. For example, in some embodiments the second data center may periodically query the database at the second data center to determine new files that need to be transmitted to the second data center.

In some embodiments, the second data center writing the information into the database at the second data center may comprise the second data center writing into the database a first record corresponding to the first copy of the file at the first data center and a second record corresponding to the second copy of the file at the second data center. The second record may indicate that the second copy of the file at the second data center has not yet been created. After the file is transmitted to the second data center, the second data center may update the second record in the database at the second data center to indicate that the second copy of the file has been created at the second data center.

The method may further comprise, in response to receiving the file, the first data center writing into a database at the first data center a first record corresponding to the first copy of the file at the first data center and a second record corresponding to the second copy of the file at the second data center, where the second record indicates that the second copy of the file at the second data center has not yet been created. After creating the second copy of the file at the second data center, the second data center may send information to the first data center indicating that the second copy of the file has been created at the second data center. In response to the information indicating that the second copy of the file has been created at the second data center, the first data center may update the second record in the database at the first data center to indicate that the second copy of the file has been created at the second data center.

BRIEF DESCRIPTION OF THE DRAWINGS

A better understanding of the invention can be obtained when the following detailed description is considered in conjunction with the following drawings, in which:

FIGS. 4-6 illustrate examples of database file records written into a database at a first data center, where the file is initially received at the data center, and the database file records are updated over time; and FIGS. 7-8 illustrate an example of raising a priority level of a transfer request to pull a file to a destination data center.

Figure 1:
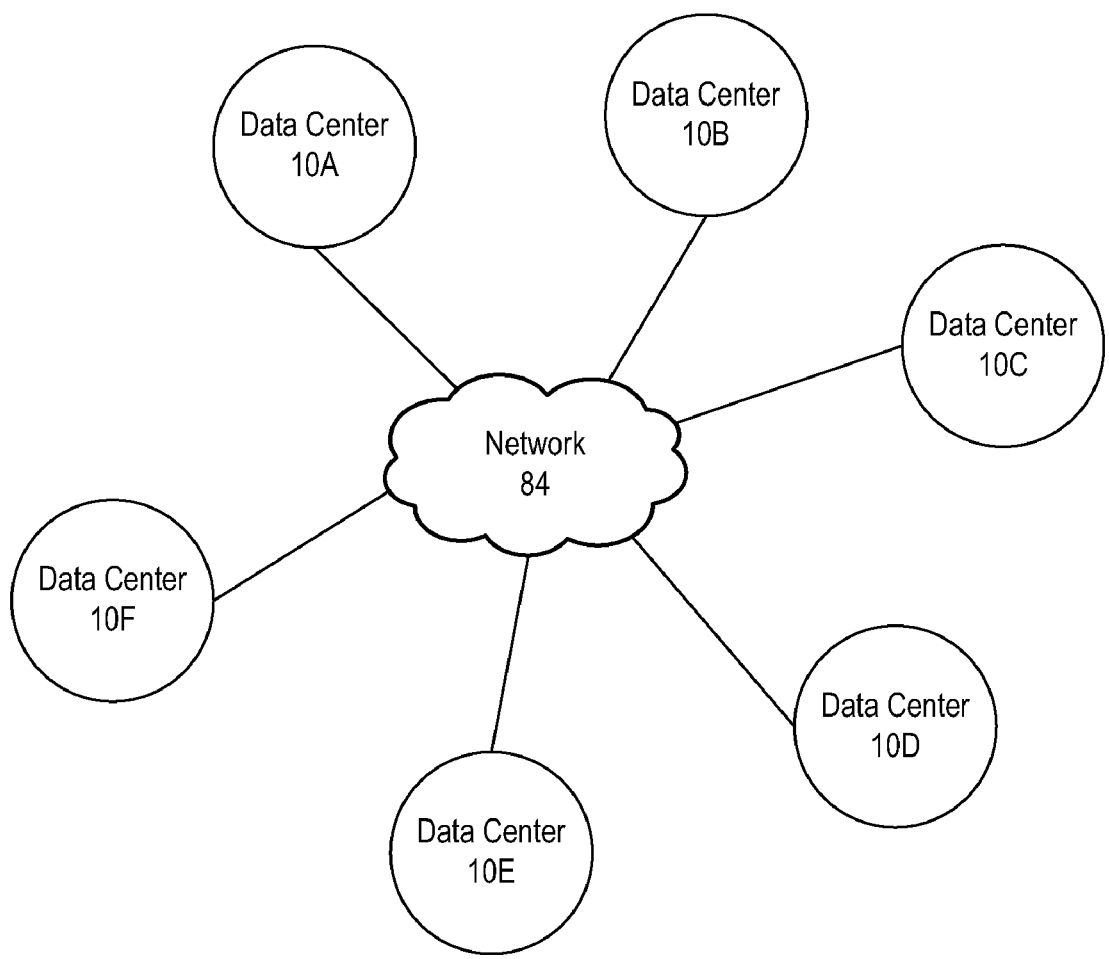
FIG. 1 illustrates one embodiment of a system including a plurality of data centers at which files are replicated.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for replicating a file at multiple data centers are described herein. Briefly described, the method may comprise creating a plurality of file records in a database at a data center that initially receives the file. Each record may correspond to a destination data center at which the file should be stored. The data center that initially receives the file may be referred to as the source data center. In various embodiments the source data center may or may not be one of the destination data centers.

The file records created in the database at the source data center may be replicated to respective databases at each of the destination data centers other than the source data center, and each of these respective destination data centers may pull a copy of the file to the respective destination data center, e.g., by initiating communication with the source data center to transfer a copy of the file to the respective destination data center. When a file is pulled to a given destination data center, the file record corresponding to the copy of the file at the given destination data center in the database at the given destination data center may be updated, and the updated file record may be communicated to the source data center and to the other destination data centers.

Thus, each destination data center other than the source data center may independently manage the transfer of the file to create a local copy of the file. By using a destination pull model, e.g., instead of a source push model, centralization of the file replication process may be avoided so that load on the source data center may be reduced. This may enable the file replication system to efficiently scale in order to handle large volumes of data.

In addition, an application that needs to access the file may be able to determine how to access the file at any given time by consulting the file records in the database. The information in the file records may indicate where one or more copies of the file can be found at any given time, and the file records may be updated over time to reflect the replication state of the file.

Referring now to FIG. 1, one embodiment of a system including a plurality of data centers 10 is illustrated. Each data center 10 may include one or more computer systems operable to store files. The data centers 10 are communicatively coupled to each other by a network 84. The data centers 10 may communicate with each other through the network 84 to replicate files according to the method described herein.

In various embodiments the network 84 may include any type of network or combination of networks. For example, the network 84 may include any type or combination of local area network (LAN), a wide area network (WAN), wireless networks, an Intranet, the Internet, etc. Exemplary local area networks include Ethernet networks, Fiber Distributed Data Interface (FDDI) networks, and token ring networks. In some embodiments each data center 10 is geographically separated from the other data centers 10, and the various data centers 10 are coupled to each other by a wide area network, such as the Internet.

Figure 2:
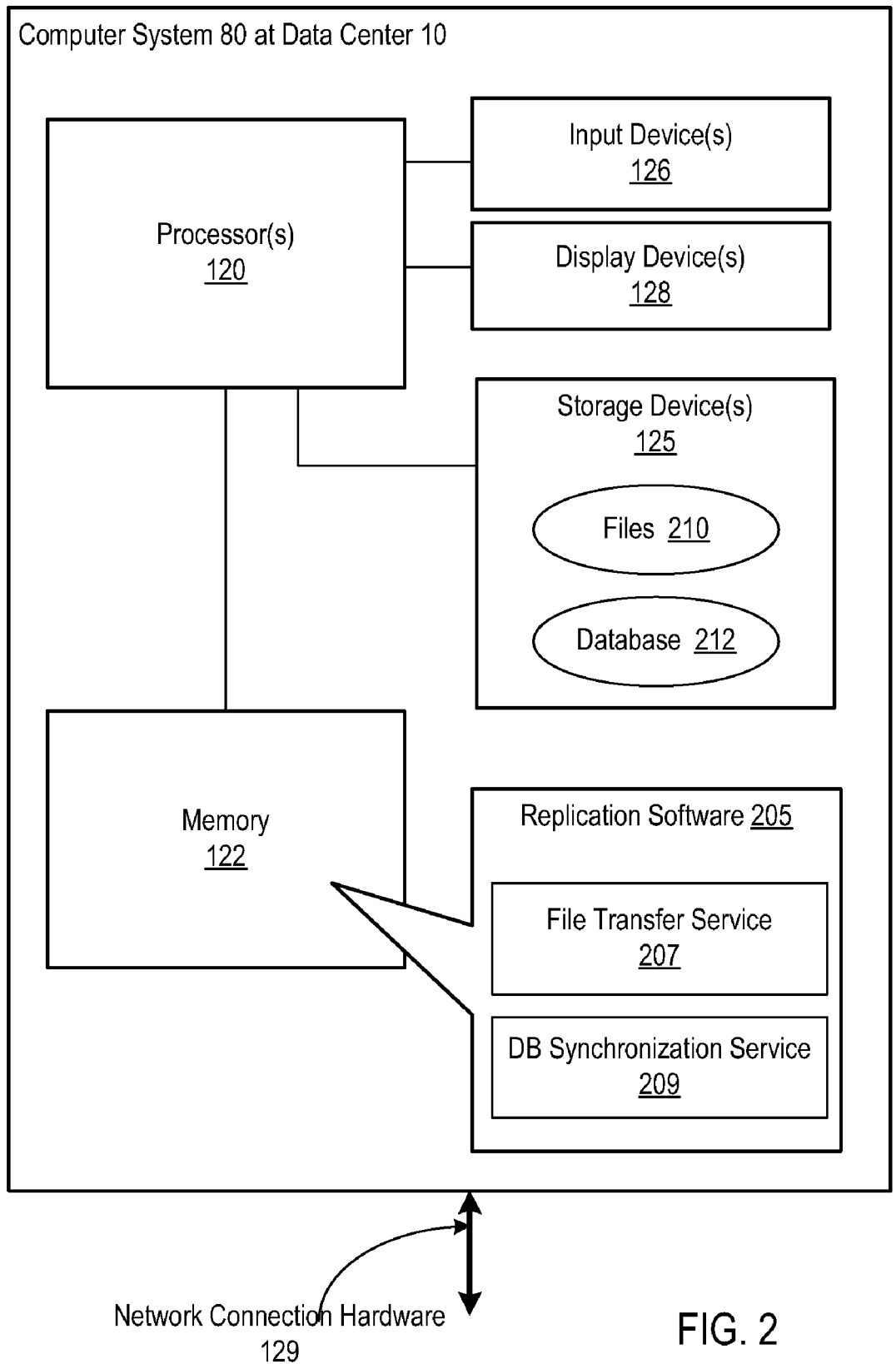
FIG. 2 illustrates one embodiment of a computer system operable to store files at a given data center.

FIG. 2 illustrates one embodiment of a computer system 80 operable to store files at a given data center 10. In various embodiments the computer system 80 may comprise any type of computer system. In this example, the computer system 80 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The processor 120 is representative of any type of processor. For example, in some embodiments, the processor 120 may be compatible with the x86 architecture, while in other embodiments the processor 120 may be compatible with the SPARC™ family of processors. Also, in some embodiments the computer system 80 may include multiple processors 120.

The memory 122 may be configured to store program instructions and/or data. In particular, the memory 122 may store replication software 205. The replication software 205 executing at different respective data centers 10 may communicate to replicate files 210 according to the method described herein. The memory 122 may also store other software which operates in conjunction with or which is used by the replication software 205, such as database management software, network communication software, and operating system software.

In various embodiments the replication software 205 may be implemented in any of various ways and may have any desired software architecture. For example, in some embodiments the replication software 205 may be implemented as a single software application. In other embodiments the replication software 205 may be implemented as two or more software programs, applications, or services that operate in conjunction with each other.

For example, in the embodiment illustrated in FIG. 2, the replication software 205 includes a file transfer service 207 and a database synchronization service 209. The file transfer services 207 executing at different data centers 10 may communicate with each other to transfer files 210 as described below. The database synchronization services 209 executing at different data centers 10 may communicate with each other to keep databases 212 stored at the respective data centers 10 synchronized with each other. For example, the database synchronization service 209 at a given data center 10 may inform the database synchronization service(s) 209 at one or more other data centers 10 when records in a database 212 at the given data center 10 are updated, as described below.

The computer system 80 also includes or is coupled to one or more storage devices 125. In various embodiments the storage devices 125 may include any of various kinds of storage devices operable to store data, such as optical storage devices, disk drives, tape drives, flash memory devices, etc. As one example, the storage devices 125 may be implemented as one or more disk drives configured independently or as a disk storage system.

As shown in FIG. 2, the one or more storage devices 125 may store various files 210. For example, in some embodiments the file transfer service 207 executing on a computer system 80 at a given data center 10 may receive a file 210 from an external application, store the file 210 on a local storage device 125, and communicate with the file transfer service 207 executing on a computer system 80 at one or more other data centers 10 in order to replicate the file 210 to the one or more other data centers 10. Thus, the computer system(s) 80 at the one or more other data centers 10 may store respective local copies of the file 210 on their respective storage devices 125.

The one or more storage devices 125 at each respective data center 10 may also store a respective database 212. The database 212 at a given data center 10 may include records corresponding to the files 210. For example, for a given file 210 with copies stored at a plurality of data centers 10, the database 212 may include a plurality of records, where each record corresponds to one of the data centers at which a copy of the file 210 is stored. The database synchronization services 209 executing at different data centers 10 may communicate with each other to replicate file records across databases stored at different data centers 10, as described below.

Referring again to FIG. 2, the computer system 80 may also include one or more input devices 126 for receiving user input from a user of the computer system 80. The input device(s) 126 may include any of various types of input devices, such as keyboards, keypads, microphones, or pointing devices (e.g., a mouse or trackball). The computer system 80 may also include one or more output devices 128 for displaying output to the user. The output device(s) 128 may include any of various types of output devices or display devices, such as LCD screens or monitors, CRT monitors, etc.

The computer system 80 may also include network connection hardware 129 through which the computer system 80 connects to the network 84. The network connection hardware 129 may include any type of hardware for coupling the computer system 80 to the network 84, e.g., depending on the type of network. As noted above, in various embodiments, the computer system 80 may be coupled to any type of network or combination of networks.

It is noted that FIG. 2 illustrates one example embodiment of a computer system 80 at a data center 10, and in various embodiments a given data center 10 may include any of various other types of computer systems. Also, in some embodiments a data center 10 may include multiple computer systems 80. For example, the functions described herein as being performed by a data center 10 may be implemented by one or more computer systems 80 at the data center 10.

Figure 3A:
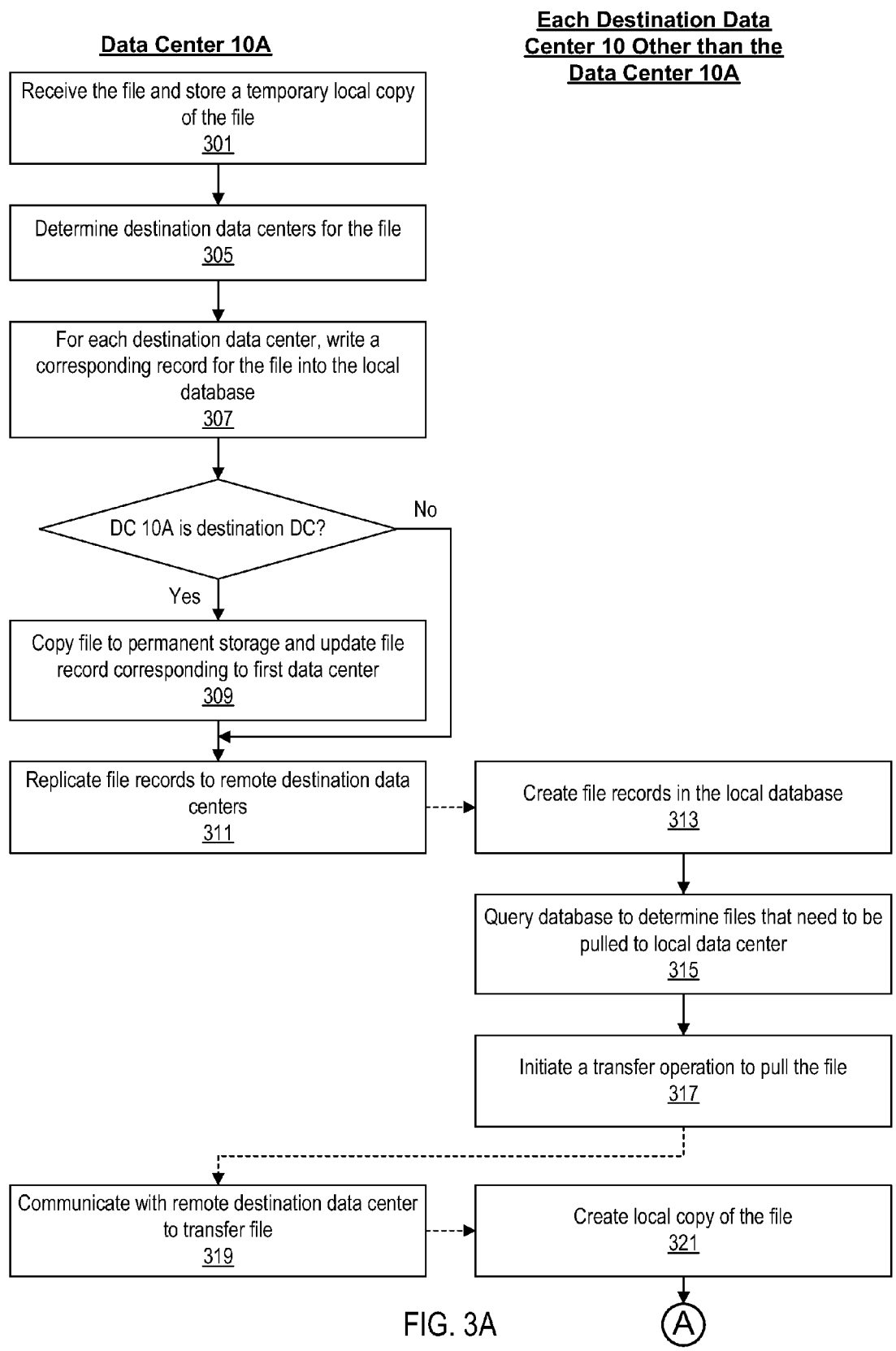
FIGS. 3A and 3B show a flowchart diagram illustrating one embodiment of a method for replicating a file at a plurality of data centers.
Figure 3B:
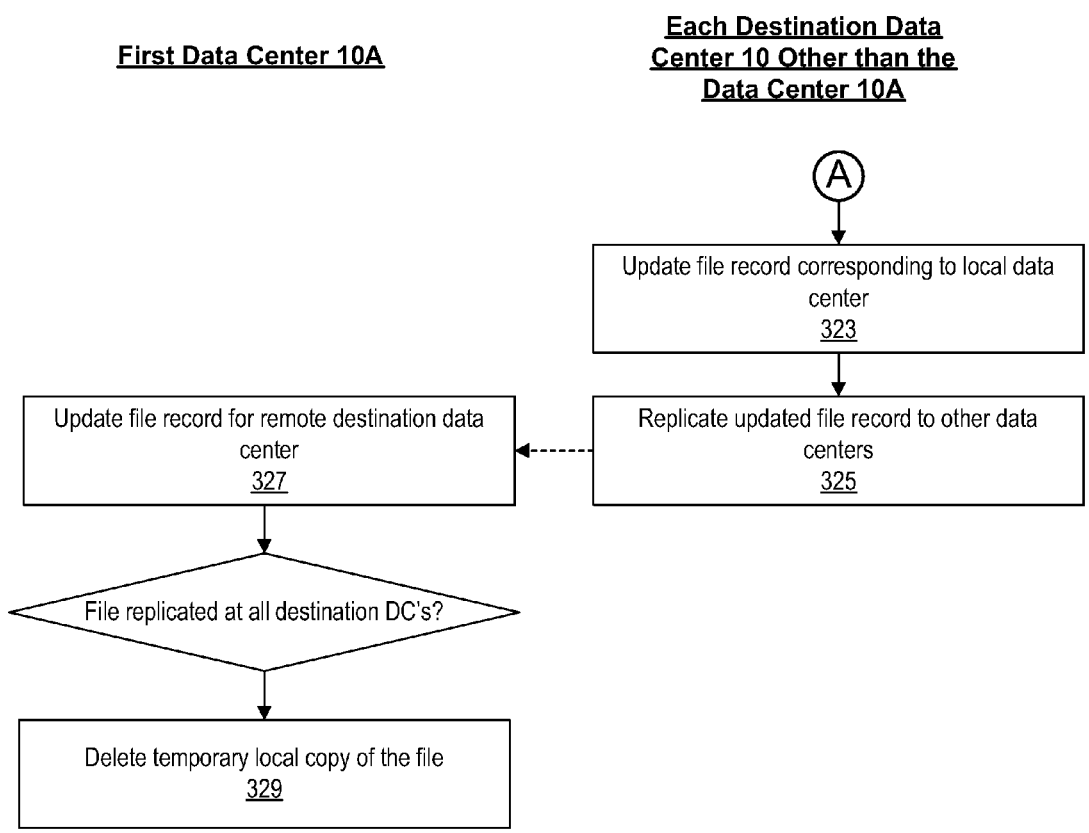

FIGS. 3A and 3B show a flowchart diagram illustrating one embodiment of a method for replicating a file 210 at a plurality of data centers. It is noted that FIGS. 3A-B illustrate an example embodiment of the method, and numerous alternative embodiments are contemplated. Also, various blocks illustrated in FIGS. 3A-B may be combined, omitted, or performed in different orders.

The flowchart illustrates an example in which a file is initially received at a data center 10A and replicated at one or more other data centers 10. The method of FIGS. 3A-B may be implemented by the file replication software 205 executing at the plurality of data centers 10 at which the file is replicated.

As indicated in block 301, the data center 10A may receive the file and store a temporary local copy of the file. For example, in some embodiments the file may be received from a remote computer system external to any of the data centers 10. In other embodiments the file may be created by a computer system 80 at the data center 10A or another data center 10, e.g., where the file is created by a user application which utilizes the file replication software 205.

In block 305, the data center 10A may determine a plurality of destination data centers 10 for the file. In various embodiments, the destination data centers 10 may be determined in any of various ways, e.g., depending on the particular application for which the file is being replicated and/or depending on the particular file. In some embodiments would the data center 10A may determine one or more attributes of the file and may determine the destination data centers 10 based on the one or more attributes of the file. In some embodiments the data center 10A may use the one or more attributes of the file to query the database 212 (or another database) stored at the data center 10A in order to determine the destination data centers 10. In various embodiments the destination data centers 10 may be determined based on any kind of file attributes. Examples of file attributes include: file owner, file size, file name, file creation time, file type, file data, etc.

The data center 10A may or may not be one of the destination data centers 10. For example, in some embodiments the file may initially be received by the data center 10A, and the data center 10A may communicate with the destination data centers 10 to replicate the file to the destination data centers 10, but the data center 10A may not store a permanent copy of the file. In other embodiments the data center 10A may be one of the destination data centers 10, e.g., may store a permanent copy of the file, along with one or more other destination data centers 10.

As indicated in block 307, for each destination data center 10, the data center 10A may write a corresponding record for the file into the local database 212 stored at the data center 10A. Each record for the file may include an identifier identifying the file. For example, in some embodiments the data center 10A may create an ID uniquely identifying the file by creating a hash value based on the file's data and/or based on other attributes of the file. Thus, each record for the file may include the hash value.

Each record written into the database 212 at the data center 10A may correspond to a respective destination data center 10 and may correspond to the respective copy of the file to be created at the respective destination data center 10. For example, if the data center 10A determines that the file should be stored at the data centers 10A and 10B then the data center 10A may write a first record for the file into the local database 212, where the first record corresponds to a first copy of the file to be stored at the data center 10A, and where the first record indicates that the destination data center for the first copy of the file is the data center 10A. Similarly, the data center 10A may also write a second record for the file into the local database 212, where the second record corresponds to a second copy of the file to be stored at the data center 10B, and where the first record indicates that the destination data center for the second copy of the file is the data center 10B.

Each record written into the database 212 may also indicate a current data center 10 where the file may be found and may indicate a location of the file at the current data center 10. Thus, in this example each record written to the database 212 may indicate that the file may currently be found at the data center 10A and may indicate the location of the temporary copy of the file created in block 301.

As indicated in block 309, if the data center 10A is one of the destination data centers 10 then the data center 10A may copy the file to a permanent storage location and may update the file record corresponding to the destination data center 10A, e.g., may update the file record to indicate the permanent storage location.

As indicated in blocks 311 and 313, the data center 10A may communicate with each of the remote destination data centers 10 other than the data center 10A in order to replicate the file database records to the remote destination data centers 10. As indicated in block 313, each respective remote destination data center 10 may create file database records in the local database 212 stored at the respective remote destination data center 10. Thus, after block 313 is performed, the respective database 212 at each respective remote destination data center 10 may have a plurality of records for the file identical to the records stored in the database 212 at the data center 10A. In some embodiments blocks 311 in 313 may be performed by the database synchronization service 209 at the data center 10A communicating with the database synchronization services 209 at the remote destination data centers 10.

For convenience, the blocks shown on the right side of FIGS. 3A-3B (blocks 313, 315, 317, 321, 323, and 325) are described as being performed by a data center 10B, e.g., where the data center 10B is one of the destination data centers 10 for the file. It is to be understood, however, that these blocks may be performed by each of the destination data centers 10 other than the data center 10A.

After the database records for the file have been written into the local database 212 at the destination data center 10B, the data center 10B may query the database to determine whether any files need to be pulled (transmitted) to the local data center 10B. For example, the data center 10B may periodically query (e.g., at regular or irregular time intervals) the local database 212 to determine whether any files need to be pulled to the data center 10B. The database query may determine the files that need to be pulled to the data center 10B by determining whether the database 212 has any file records indicating the destination data center as the data center 10B but indicating the current data center as a data center 10 other than the data center 10B. Thus, since the query may discover that the database 212 includes a file record for the file received in block 301 indicating the destination data center as the data center 10B but indicating the current data center as the data center 10A.

As indicated in block 317, the data center 10B may initiate a transfer operation to pull the file from the data center 10A to the data center 10B. In some embodiments the data center 10B may immediately initiate respective transfer operations for each file that needs to be pulled to the data center 10B. In other embodiments the data center 10B may utilize a transfer request queue and make queue respective transfer requests for each file that needs to be pulled to the data center 10B.

When the transfer operation for the file is initiated, the data center 10A may communicate with the data center 10B to transfer the file to the data center 10B, as indicated in block 319, and the data center 10B may create a local copy of the file at the data center 10B, as indicated in block 321.

The actual file transfer may be performed largely independently of the database update operations. The file transfer service 207 at the data center 10B may communicate with the file transfer service 207 at the data center 10A to transfer the file to the data center 10B using any desired communication protocol. Examples of protocols that may be used include an HTTP interface over web services, File Transfer Protocol (FTP), or other TCP/IP based protocols. In some embodiments different destination data centers 10 may communicate with the data center 10A to transfer the file using different communication protocols. For example, the file transfer service 207 may include different file replication adapters corresponding to different communication protocols.

As discussed above, the file records corresponding to the various copies of the file may indicate not only the current site at which a respective copy of the file can be found, but also the exact location of the file. This may further reduce load on the site from which the file is transferred since the destination data center 10 may pass information indicating where the file is located, thus avoiding the need to look up this information. However, if the information is no longer valid, e.g., if the file at the source data center 10 was moved for storage management purposes, then the current location of the file may be looked up at the source data center 10.

As indicated in block 323, the data center 10B may update the file record corresponding to the data center 10B in order to indicate that the local copy of the file has been created. In particular, the file record with the destination site listed as the data center 10B may be updated to indicate that the current data center 10 where the respective copy of the file may be found is the data center 10B instead of the data center 10A. The file record may also be updated to indicate the location of the file at the data center 10B.

As indicated in block 325, the updated file record may be replicated to other data centers. For example, as indicated in block 327, the data center 10A may update the file record corresponding to the copy of the file at the data center 10B in order to indicate that the respective copy of the file is no longer found at the data center 10A, but is now found at the data center 10B. If there are any destination data centers 10 other than the data centers 10A and 10B then the updated file record may also be replicated to these other destination data centers 10.

As indicated in block 329, after the file record has been updated in block 327, the data center 10A may determine whether the file has been replicated at all the destination data centers 10. For example, the data center 10A may query the local database 212 at the data center 10A to determine whether there are any records for the file indicating a destination data center other than the data center 10A but indicating that the current data center for the respective copy of the file is the data center 10A. If there are any such records then there are still one or more destination data centers 10 that have not yet pulled the file. Otherwise, the temporary local copy of the file created in block 301 may be deleted, as indicated in block 329.

FIGS. 4-6 illustrate examples of database file records written into a database 212 at a data center 10A, where the destination data centers for the file are the data centers 10A and 10B, and the file is initially received at the data center 10A. In this example, the data center 10A has an ID of 1, and the data center 10B has an ID of 2.

The data center 10A may first create a temporary local copy of the file at the location, "\\192.168.1.100\Uploaded\Test.doc". As illustrated in FIG. 4, the data center 10A may initially write two records for the file corresponding to the two copies of the file to be stored at the data centers 10A and 10B, respectively. The first record indicates that the copy of the file to be stored at the data center 10A has a destination site ID of 1 (the ID of the data center 10A), a current site ID also of 1, and a current location of "\\192.168.1.100\Uploaded\Test.doc". The second record indicates that the copy of the file to be stored at the data center 10B has a destination site ID of 2 (the ID of the data center 10B), a current site ID of 1, and a current location of "\\192.168.1.100\Uploaded\Test.doc".

The data center 10A may then create a permanent copy of the file at another location, e.g., the location "\\192.168.1.126\Docs\Test.doc". The data center 10A may then update the file record corresponding to the copy of the file stored at the data center 10A in order to indicate the permanent location, as indicated in FIG. 5.

As described above, after the file records have been replicated to the destination data center 10B and the data center 10B has pulled the file to create another copy of the file at the data center 10B, the data center 10B may update the file record corresponding to the copy of the file at the data center 10B and may communicate with the data center 10A to update the corresponding file record at the data center 10A. FIG. 6 illustrates the file record at the data center 10A after it has been updated. As shown, the file record corresponding to the copy of the file at the data center 10B now indicates that both the destination data center and the current data center are the data center 10B, and also indicates the location of the copy of the file at the data center 10B.

Thus, after the operations described above have been performed, each destination data center 10 stores a plurality of records indicating where a plurality of copies of the file can be found at the respective destination data centers 10. If an application at one of the data centers 10 needs to access the file and the file is inaccessible at the data center 10 for some reason then the data center 10 may remotely access the file from one of the other data centers 10 using the information in a database record corresponding to the other data center 10.

In the embodiment of the method described above, each destination data center other than the data center 10A that initially receives the file may pull a copy of the file from the data center 10A. In other embodiments, one or more of the destination data centers 10 may pull a copy of the file from a data center other than the data center 10A. For example, after a destination data center 10B has pulled a copy of the file from the data center 10A, another destination data center 10C may pull a copy of the file from the data center 10B instead of the data center 10A. For example, after the copy of the file has been created at the data center 10B, the data center 10B may communicate with the data center 10C to cause the data center 10C to update the file record that corresponds to the data center 10C to indicate that the current data center where the copy of the file can be obtained is the data center 10B, e.g., instead of the data center 10A. Such techniques may enable the replication of the file to be further distributed, e.g., in order to further reduce load on the data center that initially receives the file.

It is noted that an application at a given destination data center 10 has sufficient information for accessing the file as soon as the file records have been written into the local database 212 at the given destination data center 10. For example, even if the file has not yet been pulled to the given destination data center 10, the database information may be used to remotely access a copy of the file from another data center 10.

As described above, in some embodiments the given data center 10 may queue transfer requests for files that need to be pulled to the given data center 10. For example, FIG. 7 illustrates a request queue 400 in which a plurality of transfer requests have been queued. In some embodiments each transfer request may be assigned a priority level. If an application at the given data center 10 requests to access a file for which a transfer request has been queued but not yet initiated within the priority level of the transfer request may be increased. For example, as illustrated in FIG. 8, the priority level of the transfer request for the file whose ID is 1104 has been changed to "high" in response to an application requesting to access the file. This may enable the respective file to be transferred before the other files in the queue.

In some embodiments the method may further comprise replicating the file records from one or more of the destination data centers 10 to one or more other data centers 10 that are not destination data centers for the file. This may allow applications at the other data centers 10 to remotely access the file using the information in the file records.

Further embodiments of the method may enable the system to replicate files across data centers even in the event of a serious network outage. For example, suppose that a file is received at a data center 10A and needs to be replicated at the data center 10B, but the data center 10B is currently inaccessible from the data center 10A. File records corresponding to the destination data centers may be created in the database at the data center 10A, as described above. Information indicating the file records written to the database, as well as the file itself, may be stored on a portable storage device. The portable storage device may be manually shipped to the data center 10B. The data center 10B may be operable to read the file records from the portable storage device and replicate them in the local database at the data center 10B, similarly as described above. However, instead of communicating with the data center 10A to retrieve the file, the data center 10B may read the file from the portable storage device and update the file record corresponding to the copy of the file at the data center 10B to indicate that the local copy of the file has been created. When network communication to the data center 10A is restored, the database synchronization service 209 at the data center 10B may communicate with the database synchronization service 209 at the data center 10A to synchronize the database information.

Further embodiments of the method may enable the system to recover files that are lost at a particular data center when the data center fails. For example, consider a case where a data center 10A stores a particular file, and the data center 10A has a failure causing it to lose the file. One or more additional copies of the file may be stored at one or more other data centers. For example, a data center 10B may store a copy of the file, and the database at the data center 10B may include file records for both the local copy of the file at the data center 10B and the remote copy of the file at the data center 10A.

When the failed data center 10A comes back online, an administrator may initiate a process to recover the file at the data center 10A by updating the database at the data center 10B. In particular, the file record corresponding to the remote copy of the file previously stored at the data center 10A may be updated so that the record specifies that the current data center for this copy of the file is the data center 10B instead of the data center 10A. The updated record may be sent to the data center 10A, where it is stored in the database at the data center 10A. Thus, when the data center 10A performs a query to determine whether any files need to be pulled to the data center 10A, the data center 10A may determine that the file in question needs to be pulled because the query finds a record for the file with the destination data center listed as the data center 10A but the current data center listed as the data center 10B. Thus, the data center 10A may initiate a transfer operation to transfer a copy of the file from the data center 10B to the data center 10A.

Thus, new copies of all of the files previously stored at the data center 10A may be transferred to the data center 10A, e.g., by changing database records for the respective files at one or more other data centers 10 in the manner described above. In some embodiments the system may provide a feature for automatically changing database records at one or more other data centers 10 in order to achieve this recovery functionality. For example, an administrator may simply specify which data center has failed, and the system may automatically update appropriate file records in one or more databases at one or more other data centers in order to cause the files previously stored at the failed data center to be re-transferred to the failed data center when it recovers.

The system and method described above may be used for any of various types of applications which need to perform file replication. As one example, the system and method may be used in an online backup system in which a business backs up files for various customers. Each file received for backup may be stored at a plurality of data centers, where the file is replicated across the data centers according to the method described above. In some embodiments, the destination data centers for a given file may be determined based on the customer that owns the file. For example, for each customer there may be two or more corresponding data centers that store the customer's files.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., disk (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-accessible storage medium storing program instructions executable to implement:
   a first data center receiving a file and storing a first copy of the file;
   the first data center determining that a second copy of the file should be created at a second data center;
   the first data center sending information regarding the file to the second data center;
   in response to receiving the information regarding the file, the second data center writing information into a database at the second data center, wherein the information written to the database indicates that the file has not yet been created at the second data center and needs to be transmitted to the second data center to create the second copy of the file;
   after the information has been written into the database at the second data center, a software application at the second data center requesting to access the file;
   in response to the request from the software application:
   the second data center using the information written to the database at the second data center to determine that the first copy of the file is stored at the first data center, and the second data center communicating with the first data center to remotely access the first copy of the file stored at the first data center to satisfy the request received from the software application; and
   the second data center initiating a transfer operation to transmit the file to the second data center to create the second copy of the file.

2. The computer-accessible storage medium of claim 1, wherein the program instructions are further executable to implement:
   after writing the information into the database at the second data center, the second data center querying the database to determine one or more files that need to be transmitted to the second data center;
   wherein the second data center initiates the transfer operation to transmit the file to the second data center in response to the database query.

3. The computer-accessible storage medium of claim 1, wherein the second data center periodically queries the database at the second data center to determine new files that need to be transmitted to the second data center.

4. The computer-accessible storage medium of claim 1, wherein the second data center writing the information into the database at the second data center comprises the second data center writing into the database a first record corresponding to the first copy of the file at the first data center and a second record corresponding to the second copy of the file at the second data center;
   wherein the second record indicates that the second copy of the file at the second data center has not yet been created.

5. The computer-accessible storage medium of claim 4, wherein the program instructions are further executable to implement:
   after the file is transmitted to the second data center, the second data center updating the second record in the database at the second data center to indicate that the second copy of the file has been created at the second data center.

6. The computer-accessible storage medium of claim 5, wherein the program instructions are further executable to implement:
   in response to receiving the file, the first data center writing into a database at the first data center a first record corresponding to the first copy of the file at the first data center and a second record corresponding to the second copy of the file at the second data center, wherein the second record indicates that the second copy of the file at the second data center has not yet been created;
   after creating the second copy of the file at the second data center, the second data center sending information to the first data center indicating that the second copy of the file has been created at the second data center; and
   in response to the information indicating that the second copy of the file has been created at the second data center, the first data center updating the second record in the database at the first data center to indicate that the second copy of the file has been created at the second data center.

7. The computer-accessible storage medium of claim 6, wherein the program instructions are further executable to implement:
   after the second record in the database at the first data center has been updated to indicate that the second copy of the file has been created at the second data center, a software application at the first data center requesting to access the file;
   the first data center determining that the first copy of the file at the first data center is unavailable;
   the first data center accessing the database at the first data center to determine that the second copy of the file is stored at the second data center; and
   the first data center remotely accessing the second copy of the file stored at the second data center.

8. The computer-accessible storage medium of claim 1, wherein the first data center determining that the second copy of the file should be stored at the second data center comprises:
   the first data center determining one or more attributes of the file; and
   the first data center querying a database at the first data center to determine one or more data centers at which the file should be stored based on the one or more attributes of the file.

9. The computer-accessible storage medium of claim 1, wherein the program instructions are further executable to implement:
   the first data center determining that a third copy of the file should be stored at a third data center;
   the first data center sending information regarding the file to the third data center;
   in response to receiving the information regarding the file, the third data center writing information into a database at the third data center, wherein the information written to the database indicates that the file needs to be transmitted to the third data center to create the third copy of the file; and
   the third data center initiating a transfer operation to transmit the file to the third data center to create the third copy of the file.

10. The computer-accessible storage medium of claim 1, wherein the second data center is coupled to the first data center through a network.

11. The computer-accessible storage medium of claim 1, wherein the second data center initiating the transfer operation to transmit the file to the second data center to create the second copy of the file comprises the second data center initiating a transfer operation to transmit the file from the first data center to the second data center.

12. The computer-accessible storage medium of claim 1, wherein the second data center initiating the transfer operation to transmit the file to the second data center to create the second copy of the file comprises the second data center initiating a transfer operation to transmit the file to the second data center from a data center other than the first data center.

13. A system comprising:
a plurality of computer systems at a plurality of data centers, wherein each computer system comprises one or more processors and memory storing program instructions;
wherein the program instructions stored in the memories of the computer systems are executable by the processors of the computer systems to implement:
a first computer system at a first data center receiving a file and storing a first copy of the file;
the first computer system determining that a second copy of the file should be created on a second computer system at a second data center;
the first computer system sending information regarding the file to the second computer system;
in response to receiving the information regarding the file, the second computer system writing information into a database at the second data center, wherein the information written to the database indicates that the file has not yet been created at the second data center and needs to be transmitted to the second computer system to create the second copy of the file; and
after the information has been written into the database at the second data center, a software application at the second data center requesting to access the file;
in response to the request from the software application: the second data center using the information written to the database at the second data center to determine that the first copy of the file is stored at the first data center, and the second data center communicating with the first data center to remotely access the first copy of the file stored at the first data center to satisfy the request received from the software application; and
the second computer system initiating a transfer operation to transmit the file to the second computer system to create the second copy of the file.

14. The system of claim 13, wherein the program instructions stored in the memories of the computer systems are further executable to implement:
after writing the information into the database at the second data center, the second computer system querying the database to determine one or more files that need to be transmitted to the second computer system;
wherein the second computer system initiates the transfer operation to transmit the file to the second computer system in response to the database query.

15. The system of claim 13,
wherein the second computer system writing the information into the database at the second computer system comprises the second computer system writing into the database a first record corresponding to the first copy of the file at the first computer system and a second record corresponding to the second copy of the file at the second computer system;
wherein the second record indicates that the second copy of the file at the second computer system has not yet been created.

16. The system of claim 14, wherein the program instructions stored in the memories of the computer systems are further executable to implement:
after the file is transmitted to the second computer system, the second computer system updating the second record in the database at the second computer system to indicate that the second copy of the file has been created at the second computer system.

17. The system of claim 16, wherein the program instructions stored in the memories of the computer systems are further executable to implement:
in response to receiving the file, the first computer system writing into a database at the first computer system a first record corresponding to the first copy of the file at the first computer system and a second record corresponding to the second copy of the file at the second computer system, wherein the second record indicates that the second copy of the file at the second computer system has not yet been created;
after creating the second copy of the file at the second computer system, the second computer system sending information to the first computer system indicating that the second copy of the file has been created at the second computer system; and
in response to the information indicating that the second copy of the file has been created at the second computer system, the first computer system updating the second record in the database at the first computer system to indicate that the second copy of the file has been created at the second computer system.

18. A method comprising:
a first data center receiving a file and storing a first copy of the file;
the first data center determining that a second copy of the file should be created at a second data center;
the first data center sending information regarding the file to the second data center;
in response to receiving the information regarding the file, the second data center writing information into a database at the second data center, wherein the information written to the database indicates that the file has not yet been created at the second data center and needs to be transmitted to the second data center to create the second copy of the file; and
after the information has been written into the database at the second data center, a software application at the second data center requesting to access the file;
in response to the request from the software application: the second data center using the information written to the database at the second data center to determine that the first copy of the file is stored at the first data center, and the second data center communicating with the first data center to remotely access the first copy of the file stored at the first data center to satisfy the request received from the software application; and
the second data center initiating a transfer operation to transmit the file to the second data center to create the second copy of the file.

* * * * *